United States Patent [19]

Vollmuth et al.

[11] Patent Number: 4,608,471
[45] Date of Patent: Aug. 26, 1986

[54] IMPEDER WITH AGGREGATE FERROMAGNETIC CORE

[75] Inventors: Lawrence P. Vollmuth, Wheaton; Lucid L. Byrd, Palos Park, both of Ill.

[73] Assignee: Allied Tube & Conduit Corporation, Harvey, Ill.

[21] Appl. No.: 708,262

[22] Filed: Mar. 5, 1985

[51] Int. Cl.⁴ ............................................. H05B 6/02
[52] U.S. Cl. ............................ 219/8.5; 219/10.49 R; 219/10.79; 219/61.7
[58] Field of Search .................. 219/8.5, 9.5, 10.49 R, 219/10.43, 10.79, 59.1, 61.7

[56] References Cited

U.S. PATENT DOCUMENTS

| | | | |
|---|---|---|---|
| 2,644,881 | 7/1953 | Schorg | 219/47 |
| 2,938,993 | 5/1960 | Rudd | 219/8.5 X |
| 3,379,853 | 4/1968 | Domizi | 219/8.5 |
| 3,404,441 | 10/1968 | Manabe et al. | 219/10.49 R X |
| 3,445,616 | 5/1969 | Guyer | 219/10.51 |
| 3,619,535 | 11/1971 | Sullivan | 219/8.5 |
| 3,648,005 | 3/1972 | Rudd | 219/8.5 |
| 4,268,736 | 5/1981 | Cuvelier | 219/8.5 |
| 4,314,125 | 2/1982 | Nakamura | 219/8.5 |
| 4,443,677 | 4/1984 | DeSaw | 219/8.5 |

FOREIGN PATENT DOCUMENTS

| | | | |
|---|---|---|---|
| 2712728 | 9/1978 | Fed. Rep. of Germany | 219/10.49 R |
| 625404 | 8/1927 | France | 219/8.5 |

Primary Examiner—Philip H. Leung
Attorney, Agent, or Firm—Fitch, Even, Tabin & Flannery

[57] ABSTRACT

An impeder for use in a mill for roll-forming tubing. The mill includes a feed station for supplying an elongated steel strip in flat form and a station where the strip is transversely bent from its planar condition causing the lateral edges of the strip to be brought together in abutting relationship. An induction coil is positioned about the bent portion of the strip for inducing current flow through the location where the lateral edges first abut to heat the lateral edges to plasticity. The mill also includes a weld rolls station where the plastisized lateral edges are firmly pushed together to complete welding of the tube. The impeder is disposed inside the induction coil adjacent the location where the lateral strip edges are first brought into abutting relationship. The impeder includes an outer shell made of a strong, heat-resistant material, a core disposed inside a shell and formed by an aggregation of ferromagnetic material, and components for causing passage of a coolant through the core material.

9 Claims, 10 Drawing Figures

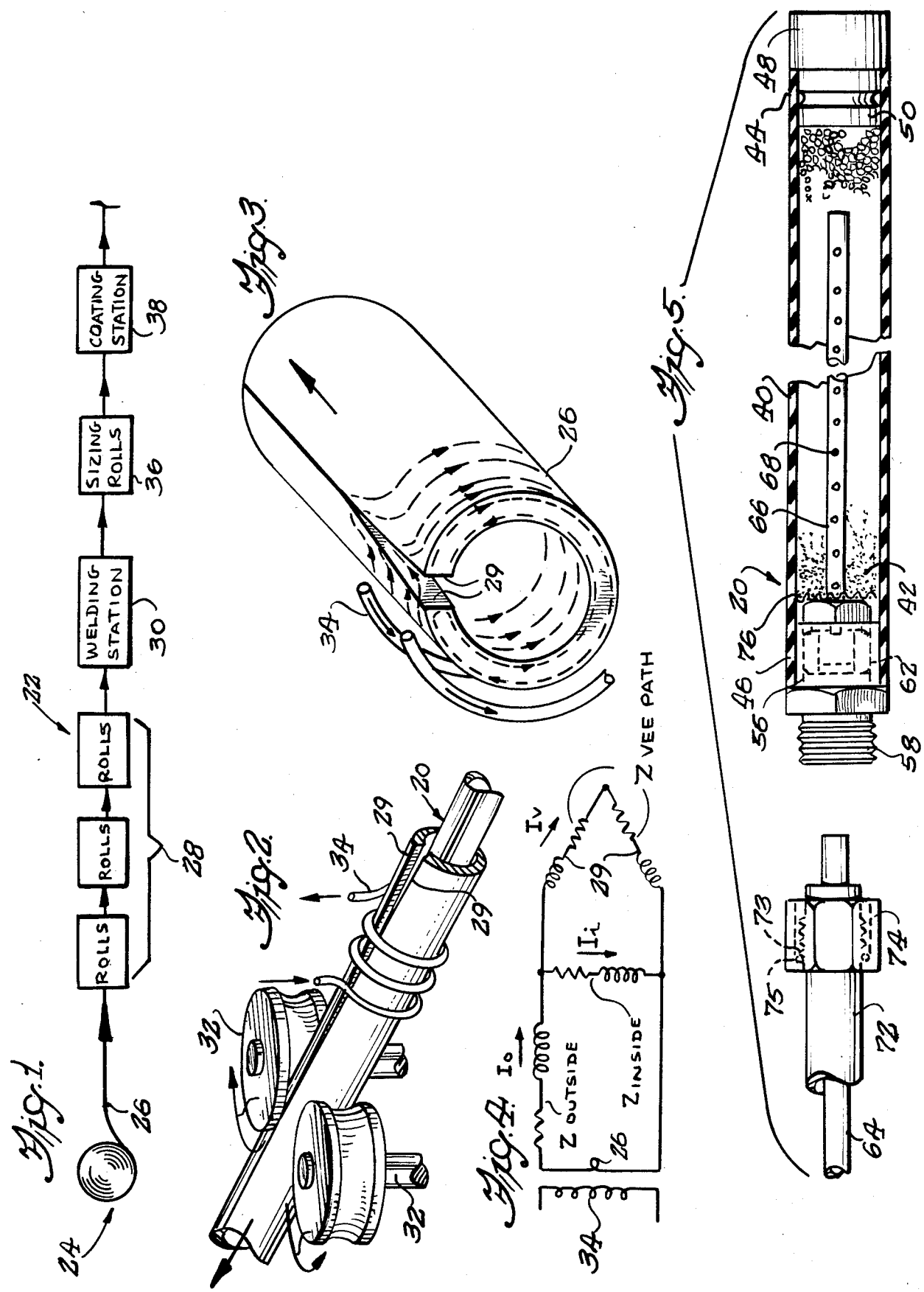

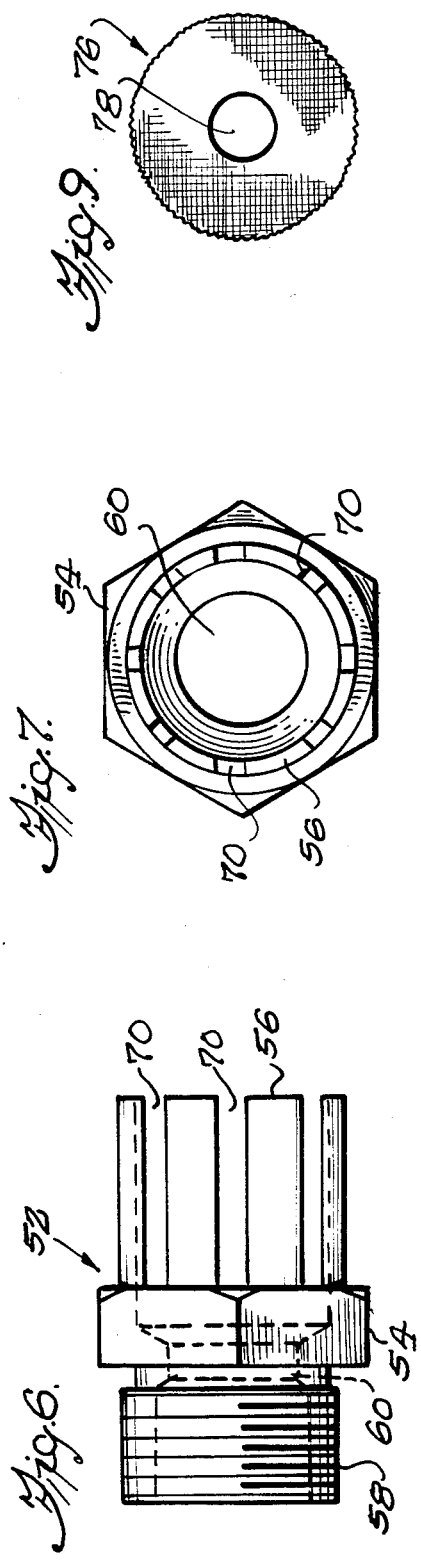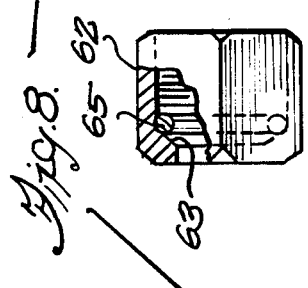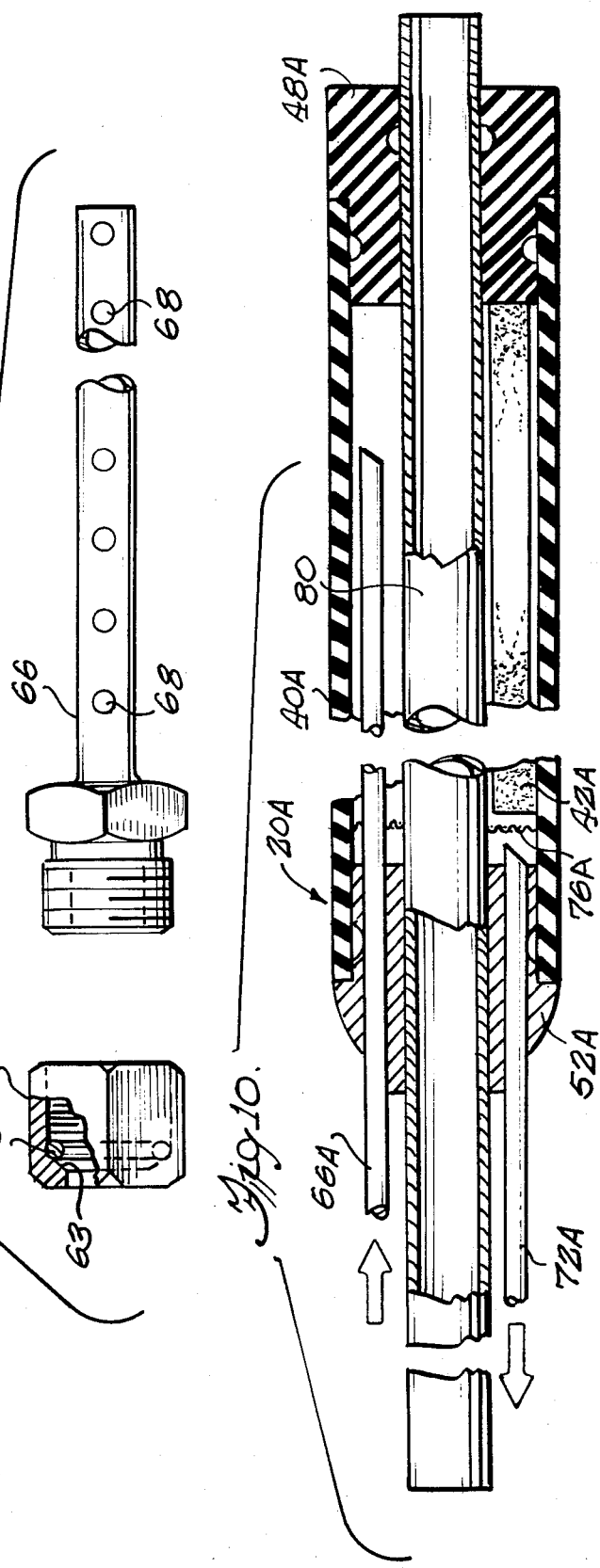

4,608,471

IMPEDER WITH AGGREGATE FERROMAGNETIC CORE

The present invention relates to a mill for roll forming tubing using induction welding and, more particularly, to an improved impeder for use with the induction coil.

BACKGROUND OF THE INVENTION

The use of induction welding in the manufacture of steel tubing using a continuous roll-forming mill has become well accepted due to the many advantages of induction welding over electrical resistance welding or gas welding. Of the more important advantages are lower overall cost, increased production rates, reduced mill downtime for welding unit part replacement or repair and no marks on the outside surface of the formed tubing.

The induction welding process uses an induction coil positioned generally coaxially around the incipient tubing adjacent to where the lateral edges of the strip are brought into abutment. A high frequency current (200–600 kHz) is applied to the induction coil which induces current in the incipient tubing in a path including the location where the lateral edges first abut (which has relatively high resistance compared to that of the remainder of the path). This causes the lateral edges to become plasticized, and their passage between weld rollers completes the welding process.

In essence, the induction coil acts as the primary of a high frequency transformer, and the tubing, with its open seam, acts as a single turn secondary. There is a tendency of radio frequency currents to flow near the surface of the conductor. Two possible current paths in the tubing are of interest. The first path includes the outside surface of the tubing and the location where the lateral edges abut. Current taking this path results in heating of the lateral edges so that welding can take place. In the second path, current returns to the outside surface by flowing around the inside tube surface. This current flow does not appreciably heat the lateral edges. To raise welding efficiency, current flow in the first path is increased while current flow in the second path is decreased.

One way to achieve this is to insert an impeder inside the induction coil adjacent the inner tubing surface. The impeder contains ferromagnetic core material having high permeability. Its use increases the inductance and therefore the impedance of the circuit of the second path, thereby reducing the current in the second path. The cores of prior art impeders are formed by one or more solid rods of a material, such as ferrite, which, while having ferromagnetic properties, is a poor conductor of electricity to reduce eddy-current losses. While such rods are typically cooled, by passage of fluid along them, to maintain them below their Curie temperature so they retain their magnetic properties, they experience localized heating due to hysteresis losses. This can result in breakage of the rods forming the core and making core replacement necessary before efficient welding can continue. For additional information about the structure and operation of prior art impeders, reference may be made to U.S. Pat. No. 4,314,125.

SUMMARY OF THE INVENTION

Among the aspects and features of the present invention may be noted the provision of an improved impeder for use in induction welding. The impeder includes a core which offers high inductance yet cannot break due to localized heating because it is not in the form of a rigid rod. The core can also be cooled much more uniformly than prior art core rods because the core of the impeder of the subject invention offers much greater surface area for direct contact with the coolant. Additionally, the impeder of the present invention is reliable in use, has long service life and in simple and economical to manufacture. Other aspects and features of the present invention will be, in part, apparent and, in part, pointed out hereafter in the following specification and accompanying claims and drawings.

Briefly, the impeder of the present invention is positioned extending inside the induction coil adjacent to the location where the lateral strip edges are first brought into abutting relationship. The impeder includes an outer shell made of a strong heat resistant material. The impeder also includes a core disposed inside the shell and formed by an aggregation of ferromagnetic material. Additionally, components are included in the impeder for causing passage of a coolant through the core material.

BRIEF DESCRIPTION OF THE DRAWINGS

FIG. 1 is a block diagram of components of a continuous roll-forming tube mill using the impeder of the present invention;

FIG. 2 is a perspective view illustrating components a welding station of the mill of FIG. 1, including the impeder of the present invention, which components function to weld the lateral strip edges together to form a tube;

FIG. 3 is a perspective view of a portion of the incipient tubing illustrating current paths resulting from operation of the induction coil;

FIG. 4 is an equivalent electrical diagram of the tubing portion of FIG. 3;

FIG. 5 is a side elevational view, partly in section, showing the impeder of the present invention;

FIGS. 6 and 7 are side elevational and front elevational views, respectively, of an adapter used in the impeder of FIG. 5;

FIG. 8 is a side elevational view of a coolant supply nozzle used in the impeder;

FIG. 9 is a front elevational view of a screen included in the impeder; and

FIG. 10 a side elevational view, partly in section, of an alternative embodiment of the impeder of the present invention, including a paint tube extending through and past the main body of the impeder for supplying protective coating material to the interior surface of the welded tube.

Corresponding reference numerals indicate corresponding components throughout the several views of the drawings.

DESCRIPTION OF THE PREFERRED EMBODIMENTS

Referring now to the drawings, an impeder of the present invention, for use in a continuous roll forming tube mill 22 employing induction welding, is generally indicated in FIGS. 2 and 5 by reference numeral 20. The mill 22 may include a feed station 24 for supplying an elongated steel strip 26. The strip, in coil form, is mounted on a payout reel suitably rotatably supported at the feed station 24. The strip 26 is received, in its flat form, at the first of possibly several breakdown and closure stations 28 employing forming-rolls which function to sequentially transversely bend the strip from its generally planar condition causing the lateral edges 29 of the incipient tubing to be brought together.

Next downstream is a welding station 30 including a plurality of weld rollers 32 which push the lateral edges 29 together. It is between the location of the weld rollers and the last forming-rolls station 28 that the lateral strip edges 29 first come into abutment. An induction coil 34 is disposed generally coaxially with the incipient tubing and positioned slightly upstream of the location where this first abutment occurs. A high frequency current is applied to this coil which induces current in the tubing resulting in the seam welding thereof as will be discussed more fully hereafter.

After completion of the seam welding, the tubing advances to a scarfing and sizing station 36 where rollers compressively engage it to insure satisfactory roundness and to give the tubing its final outside dimensions. As is well known to those of skill in the art, the mill 22 may have other stations; for example, a coating station 38 where a lacquer may be applied to the tubing for corrosion protection. The mill could also include a curing station to process the coating, a helper station to apply tension to the tubing to keep it taut, and a cutting station where the tubing is severed into lengths.

The operation of the welding station 30 is best discussed with reference to FIGS. 2-4. A high frequency current (200-600 kHz) is applied to the coil 34 which acts as the primary winding of a transformer. The about-to-be-completed tubing acts as a one turn secondary winding. Due to the skin effect, radio frequency currents flow near the surfaces of the conductor formed by the tubing. As shown in FIGS. 3 and 4, two current paths are of interest. In the first or vee path, current flows around the outside of the tubing, up one lateral edge to where the edges 29 first abut, across the abutting edges (a relatively high resistance location), and down the other lateral edge to return to the transverse flow across the outside of the tubing. This current path results in heating of the lateral edges to a plastic condition so that the weld rolls 32 can push the plasticized edges together to complete the seam welding process. Although two weld rolls are illustrated in FIG. 2, it will be appreciated that three or four could be used depending on the requirements of the application.

In the other or inside current path, the current flows from the outside of the tubing, across one lateral edge, across the inside of the tubing, across the other lateral edge and back to the outside of the tubing. Current taking this path results only in general heating of the tubing, and the power expended can be considered to represent a loss component. The current taking the "insidep" path can be reduced by increasing the impedance associated with it. This is effected by inserting the impeder 20 inside the tubing.

The impeder 20 includes an outer tubular shell 40 made of a strong, heat-resistant nonmagnetic material such as woven fiberglass, which contains a core 42 of ferromagnetic material, preferably ferrite, which is a poor conductor of electricity to limit eddy-current losses. The use of the impeder 20 intensifies the magnetic field inside the tubing thereby greatly increasing the inductance, and therefore the impedance associated with the inside current path to reduce its current.

Referring to FIG. 5, the impeder 20 of the present invention includes a core formed of an aggregation of small ferrite components. This aggregation could include components as large as pellets, or the components could be in particulate or powdered form. The size of the small ferrite components may range from about 600 mesh (powdered form) to about one-quarter inch diameter pellet form, and preferably the ferrite aggregate is between about 10 mils and about 100 mils in size. The impeder also includes means for causing passage of a coolant through the material making up the core. More specifically, the shell 40 has a free end 44 extending downstream in the mill, and an end 46 connected to a structural support. The free end 44 is closed by an end cap 48 having a plug portion 50 extending into the shell in an interference fit.

The supported end 46 holds an integral adapter 52 (best shown in FIGS. 6 and 7), preferably formed of brass, having a central body portion 54 which abuts end 46, a tubular insert 56 for reception inside the shell in an interference fit, and an oppositely extending pipe fitting 58 having a threaded outer surface. The adapter has a longitudinal coolant inlet/egress passageway 60. The insert 56 holds a compression fitting nut 62 (see FIG. 8) which interconnects a coolant inlet supply line 64 (FIG. 5) with the rear end of a coolant discharge nozzle 66 extending through the core of aggregate material to a location adjacent the free end 44. A series of spaced apertures 68 are placed in the nozzle to provide coolant flow at numerous locations therealong, as well as at its end to promote more uniform coolant flow.

The insert 56 has a number of regularly spaced slots 70 to permit return or outlet flow of the heated coolant. For this purpose a larger coolant return line 72, disposed coaxially about the coolant supply line 64 is connected to the adapter pipe fitting 58 by means of a compression fitting nut 74 (see FIG. 5). More specifically, the compression fitting nut 62 includes an internal ramp surface 63 against which is positioned a resilient O-ring 65. Upon tightening of the nut 62 on the threaded end of the nozzle 66 with the inlet supply line 64 extending into the passageway of the nut 62, the O-ring 65 is compressed against the outer surface of the supply line to hold the line and form a seal. Similarly the compression fitting 74 has an internal ramp surface 75 for engaging a ferrule 73. With the coolant return line 72 extending into the fitting 74, tightening of the fitting onto adapter pipe fitting 58 results in deformation of the ferrule between ramp surface 75 and the return line resulting in mechanical holding of the return line and formation of a seal. The interior supply line 64 provides a suitable coolant fluid (either a liquid such as water, or a gas such as nitrogen) under sufficient pressure that it flows through the aggregate core material to transfer heat away from the core. The heated fluid exits through the adapter passageway 60 (which is only partially occupied by the smaller diameter supply line 64) and flows out the return line 72.

A screen 76, best shown in FIG. 9, is disposed in the shell 40 on the nozzle 66 near its inlet end to pass heated coolant but to block the exit of substantially any of the aggregate core material. The screen is annular, having an outside diameter approximating the inside diameter of the shell and a central hole 78 snugly receiving the nozzle. Of course, the size of the mesh pattern of the screen is dictated by the particle size of the core material. It will be appreciated that the particulate nature of the core material enhances cooling of the core. The surface area of the core, available for direct contact with the coolant, is greatly increased compared to that of rigid ferrite core rods.

The supply line 64 and return line 72 may provide at least a portion of the structural support necessary to hold the impeder in place. Additionally, a supporting bracket such as a narrow vertical arm (not illustrated) could be attached to the adapter flange 54.

The impeder 20 of the present invention may be assembled as follows: After the supply line 64 is connected to the nozzle 66 using compression nut 62, the nut is fitted into the tubular insert 56 of the adapter 52. With the screen 76 in place, the assembly is inserted into the shell 40 through end 46. The core material is then loaded into the shell through the free end 44 which is subsequently closed using end cap 48. Finally the return line 72 is connected using the compression fitting 74, and the completed impeder is positioned coaxially within the induction coil 34.

Referring now to FIG. 10, an alternative embodiment of the impeder of the present invention is generally indicated by reference character 20A. Components of impeder 20A corresponding in function to components of impeder 20 are indicated by the reference numeral applied to the component of impeder 20 with the addition of the suffix "A". The impeder 20A also includes a core 42A made up of aggregate form ferrite held inside a tubular shell 40A. A paint tube 80 extends centrally through the shell, from an adapter 52A and out an end cap 48A, for supplying a corrosion-resistant coating to the inside of the seam-welded tubing downstream of the weld rolls. The full extension of the paint tube or lance and a nozzle carried at the free edge thereof are not shown, but their construction will be apparent to those of skill in the art. The impeder 20A also includes a coolant supply tube 66A extending to a location generally adjacent the end cap 48A, and a lower coolant return line 72A, spaced below the supply tube and extending just past the adapter and terminating in a plenum formed just to the left of a screen 76A which prevents loss of aggregate core material.

While the impeder 20 has been described in the mill 22 for forming round tubing, the impeder of the present invention is also useable with a mill for forming square, rectangular or other shaped tubing. In such case the impeder shell could remain cylindrical or it could have a configuration in accordance with the shape of the tubing.

In view of the above, it will be seen that the several objects of the invention are achieved and other advantageous results attained.

As various changes could be made without departing from the scope of the invention, it is intended that all matter contained in the above description shall be interpreted as illustrative and not in a limiting sense.

What is claimed is:

1. A combination for use in a mill for roll-forming tubing including a feed station for supplying an elongated steel strip in flat form and a station where the strip is transversely bent from its generally planar condition causing the lateral edges of the strip to be brought together in abutting relationship, said combination comprising an induction coil disposed about the bent portion of said strip for inducing current flow through the location where said lateral edges are first brought into abutting relationship to heat said lateral edges to plasticity, a weld rolls station where the plasticized lateral edges are firmly pushed together to complete welding of the tube, and an impeder disposed extending inside said coil adjacent the location where said lateral edges are first brought into abutting relationship, said impeder comprising:
   an outer shell made of strong, heat resistant material;
   a core disposed inside said shell, said core being formed by loose ferrite particles with the major dimension of each of said ferrite particles being in the range of one-quarter inch to 600 mesh; and
   means for causing passage of a coolant through the core material.

2. A combination as set forth in claim 1 wherein said shell is tubular and formed of fiberglass.

3. A combination as set forth in claim 1 wherein said outer shell is connected to a structural support at one end and is free at the other end, the free end of said shell being closed by an end cap with the supported end of said shell being connected to an adapter having a passageway for said coolant.

4. A combination as set forth in claim 3 wherein said means comprises a coolant inlet tube extending through said passageway and adapted to be connected to said adapter, and a coolant outlet tube which is coaxial with said inlet tube and adapted to be connected to said adapter.

5. A combination as set forth in claim 4 wherein said coolant inlet tube is connected to a nozzle which extends through the aggregate core adjacent said distal end.

6. A combtination as set forth in claim 4 comprising a screen covering the entrance to said coolant outlet tube, said screen having a sufficiently fine mesh to prevent loss of the aggregate core material.

7. A combination as set forth in claim 3 further comprising a paint tube extending axially in said shell and through said end cap for supplying a corrosion-resistant coating to the inside of said tubing downstream of said weld rolls station.

8. An impeder for use in a mill for roll-forming tubing including a feed station for supplying an elongated steel strip in flat form, a station where the strip is transversely bent from its generally planar condition causing the lateral edges of the strip to be brought together in abutting relationship, an induction coil disposed about the bent portion of said strip for inducing current flow through the location where said lateral edges are first brought into abutting relationship to heat said lateral ends to plasticity, and a weld rolls station where the plasticized lateral edges are firmly pushed together to complete welding of the tube, said impeder being disposed extending inside said coil adjacent the location where said lateral edges are first brought into abutting relationship and comprising:
   an outer shell made of strong, heat resistant material;
   a core disposed inside said shell, said core being formed by loose ferrite particles with the major dimension of each of said ferrite particles being in the range of one-quarter inch to 600 mesh; and
   means for causing passage of a coolant through the core material.

9. An impeder as set forth in claim 8 wherein the major dimension of said ferrite particles is in the range of 10 mils to 100 mils.

* * * * *